(12) United States Patent
Rembe et al.

(10) Patent No.: US 7,808,646 B2
(45) Date of Patent: Oct. 5, 2010

(54) INTERFEROMETER FOR OPTICALLY MEASURING AN OBJECT

(75) Inventors: Christian Rembe, Waldbronn (DE); Tobias Haist, Stuttgart (DE)

(73) Assignee: Polytec GmbH, Waldbronn (DE)

( * ) Notice: Subject to any disclaimer, the term of this patent is extended or adjusted under 35 U.S.C. 154(b) by 4 days.

(21) Appl. No.: 12/040,073

(22) Filed: Feb. 29, 2008

(65) Prior Publication Data
US 2008/0304075 A1 Dec. 11, 2008

(51) Int. Cl.
*G01B 9/021* (2006.01)
(52) U.S. Cl. .................................................. 356/457
(58) Field of Classification Search .................. 356/485, 356/489, 492, 495, 496, 511–514, 521
See application file for complete search history.

(56) References Cited

U.S. PATENT DOCUMENTS

| | | | |
|---|---|---|---|
| 3,631,713 | A | 1/1972 | Marom |
| 4,492,468 | A | 1/1985 | Huignard et al. |
| 5,737,079 | A | 4/1998 | Burge et al. |
| 2004/0125380 | A1* | 7/2004 | Pepper ........................ 356/512 |
| 2005/0117167 | A1 | 6/2005 | Yasuda et al. |
| 2006/0114473 | A1* | 6/2006 | Tearney et al. .............. 356/479 |
| 2007/0263226 | A1* | 11/2007 | Kurtz et al. .................. 356/492 |

FOREIGN PATENT DOCUMENTS

| | | |
|---|---|---|
| DE | 19511926 | 10/1996 |
| JP | 2004151058 | 5/2004 |

* cited by examiner

*Primary Examiner*—Tarifur Chowdhury
*Assistant Examiner*—Jonathon D Cook
(74) *Attorney, Agent, or Firm*—Volpe and Koenig, P.C.

(57) ABSTRACT

An interferometer for optically measuring an object (10), including a light source (1), at least one beam splitter (2) and at least one detector (12a, 12b), with the beam splitter being arranged in the beam path of the light source such that a light beam created by the light source is split into a working beam (3) and a reference beam (4). The interferometer is embodied such that the working beam impinges on the object (10) to be measured and the working beam is at least partially reflected by the object and interfered with the reference beam on the detector (12a, 12b). Here it is essential that the interferometer is provided with a spatial light modulator, which comprises a hologram control unit (9) and a hologram reconstruction unit (8) connected thereto, with the hologram reconstruction unit being arranged in the beam path of the working beam between the beam splitter (2) and the object (10) and the hologram control unit (9) controlling the hologram reconstruction unit (8) such that the hologram reconstruction unit creates an optionally predetermined hologram such that the working beam is deflected and/or split by the hologram reconstruction unit.

2 Claims, 4 Drawing Sheets

INTERFEROMETER FOR OPTICALLY MEASURING AN OBJECT

CROSS-REFERENCE TO RELATED APPLICATIONS

This application claims the benefit of DE 10 2007 010 387.7, filed Mar. 3, 2007, which is incorporated herein by reference as if fully set forth.

BACKGROUND

The invention relates to an interferometer for optically measuring an object.

The typical design of an interferometer for optical measuring comprises a light source, a beam splitter, and a detector. Using the beam splitter a light beam from the light source is split into a working beam and a reference beam. The working beam impinges the object to be measured and is at least partially reflected by it. The (partially) reflected working beam reenters the beam path of the interferometer and is here interfered with the reference beam on the detector. The measuring signal of the detector is therefore an interference signal of interfering beams.

A motion of the object in reference to the interferometer influences the frequency of the returned working beam so that by an evaluation of the detector signal deductions can be made about the motion of the object and particularly the speed of motion can be determined. Such devices are also called "Laser-Doppler—Vibrometers".

For the optic measuring of an object it is frequently necessary to measure several measuring points on the object. This is the case in motor vehicle technology, for example, in order to detect oscillations of an internal combustion engine. Here, it is necessary to measure the oscillations at several points of the motor housing or at the vehicle body, e.g., to determine not-reproducible transient motor vibrations.

SUMMARY

The invention is therefore based on improving the prior known interferometer with regard to measuring several measuring points on an object. The interferometer according to the invention is particularly be characterized in a simple and robust design.

The invention provides an interferometer as well as the use of a spatial light modulator for deflecting and/or splitting a working beam of an interferometer.

Various advantageous embodiments of the interferometer are described in detail below and recited in the claims.

The interferometer according to the invention is therefore characterized in that it comprises a spatial light modulator. It includes a hologram control unit and a hologram reconstruction unit connected thereto.

The hologram reconstruction unit is arranged in the beam path of the working beam between the beam splitter and the object so that the working beam can be influenced by the hologram reconstruction unit before it impinges the measuring object.

The hologram control unit is connected to the hologram reconstruction unit and controls it such that an optionally predetermined hologram is created in the hologram reconstruction unit. The hologram is predetermined such that the working beam is deflected and/or split up by the hologram reconstruction unit.

It is therefore essential that the working beam is influenced by a hologram prior to impinging the object to be measured and that the hologram can be predetermined such that the working beam can be deflected and/or split.

Influencing a light beam by a hologram and the creation of such a hologram, for example via a computer, is already known and is described for example in Haist, T., Schoenleber, M., Tiziani, H. J., "Computer-generated Holograms From 3 D-Objects Written on Twisted-Nematic Liquid Crystal Displays", Optics Communications, 140 (4-6), pp. 299-308 (1997) and Haist, T., Reicherter, M., Min Wu, Seifert L., "Using Graphics Boards to Compute Holograms", Computing in Science and Engineering, January 2006, pp. 8-14. The deflection and/or splitting of a light beam via a hologram is also known in optic tweezers, and described for example in M. Reicherter, T. Haist, E. U. Wagemann, H. J. Tiziani, "Optical Particle Trapping With Computer-Generated Holograms Written On A Liquid-Crystal Display", Optics Letters, 24 (1999) pp. 608-610.

The use of a hologram to influence the working beam results in a number of advantages:

Using the hologram the working beam can be influenced without requiring mobile parts, such as for example mechanically moved mirrors or Piezo-elements. This leads to a higher resilience of the interferometer and reduced maintenance expense. Furthermore, using the spatial light modulator a deflection or a splitting of the light beam or both a deflection as well as a splitting of the light beam can be achieved by the hologram. This results in high flexibility, which can be achieved by the hologram control unit differently addressing the hologram reconstruction unit. Thus, flexibility is ensured without requiring any changes in the device, but by merely providing appropriate processes in the hologram control unit for controlling the hologram reconstruction unit. A change of the hologram created in the hologram reconstruction unit is also possible very quickly so that the working beam can be differently influenced in a rapid temporal sequence without having to consider, for example, limits caused by the inertia of a mobile mirror.

In a preferred embodiment the interferometer according to the invention is embodied such that the hologram control unit creates a hologram in the hologram reconstruction unit, depending on an optionally predetermined deflection angle, so that the working beam is influenced by the hologram such that it is deflected by a predetermined angle.

A predetermined deflection angle here represents any specification presetting an unambiguous deflection of the working beam in the three-dimensional space in reference to the non-deflected working beam. For example, a Cartesian coordinate system can be selected such that the non-deflected working beam extends along the X-axis. In this case, the pre-determinable deflection angle may be characterized for example by presetting a deflection angle in the XZ-plane and a deflection in the XY-plane perpendicular in reference thereto, i.e. in this case the pre-determinable deflection angle would comprise a pair of two angular values. However, the pre-determinable deflection angle is also possible by any other specification defining an unambiguous spatial direction.

In another advantageous embodiment, the hologram control unit is embodied such that a measuring point can be predetermined on the object. Depending on this specification, the hologram control unit creates a hologram in the hologram reconstruction unit such that the working beam impinges the predetermined measuring point on the object by being influenced via the hologram. The measuring point can for example be predetermined by (X, Y, Z)-coordinates in a Cartesian coordinate system.

The hologram reconstruction unit is preferably embodied as a reflecting optic unit. The working beam of the interferometer is therefore reflected by the hologram reconstruction unit and impinges the object to be measured. However, the measuring beam is additionally influenced during the reflection by the hologram reconstruction unit, i.e. it is deflected and/or split.

The reflecting hologram reconstruction unit can for example be embodied as an array of mirrors. Such an array of mirrors comprises a multitude of individually controlled micro-mirrors, commonly arranged in a rectangular grid. Using the hologram control unit each micro-mirror of the array of mirrors can be individually addressed such that optionally the working beam is reflected or absorbed. This way, arbitrary patterns of reflecting and/or non-reflecting elements can be created on the array of mirrors and thus a hologram can also be created on the array of mirrors according to the principle of a Fresnel lens. Conventional arrays of mirror only influence the intensity of an impinging light beam. However, novel developments of arrays of mirrors are also known which influence the phase of the impinging light beam.

It is also possible to execute the reflecting hologram reconstruction unit in form of a liquid-crystal-on-silicon modulator. In this case, the reflecting hologram reconstruction unit is therefore embodied as a liquid crystal display (LCD), in which a multitude of pixels can each be individually addressed by the hologram control unit.

In the liquid-crystal-on-silicon modular it is essential that the working beam is reflected by the modulator and here both the intensity as well as the phase of the working beam can be influenced. Therefore, the hologram control unit can optionally influence different partial sections of the working beam with regard to the intensity and/or the phase.

This results in the advantage that by the use of the liquid-crystal-on-silicon modulator a higher frequency can be achieved, i.e. particularly a higher light intensity of the reflected working beam.

In another advantageous embodiment, the hologram reconstruction unit is embodied as a transparent optic unit. In this case the hologram reconstruction unit can be embodied as a transparent liquid crystal display (LCD), for example. The function of the transparent LCD is identical to the above-described liquid-crystal-on-silicon modulator, however, here the working beam is not reflected but passes through the transparent hologram reconstruction unit and thus it is influenced with regard to intensity and/or the phase.

Furthermore, it is advantageous to embody the interferometer as a heterodyne interferometer. In a heterodyne interferometer the frequencies of the working beam and the reference beam are off-set in reference to each other, so that from the interference signal not only the speed of motion but also the direction of motion of the object can be determined. Typically a heterodyne interferometer is provided with a frequency shift unit, which is arranged in the beam path of the working beam and/or the reference beam. Using the frequency shift unit the frequencies of the working beam and the reference beam are off-set in reference to each other so that the direction of motion can be determined from the interference signal.

The interferometer according to the invention can be embodied such that the working beam, at least partially reflected by the measuring object, reenters the beam path of the interferometer via the hologram reconstruction unit and subsequently via a second beam splitter it is interfered with the reference beam on the detector, for example.

Examinations of the applicant have shown, however, that influencing the working beam via a hologram lead to distortions, i.e. undesired components of the working beam, which are also reflected by the measuring object, and which may return to the beam path of the interferometer and thus may lead to a falsification of the measurements.

The undesired components comprise portions of working beams which are deflected at different angles than the predetermined deflection angle and thus fail to impinge the measuring point on the measuring object.

In an advantageous embodiment the interferometer according to the invention is provided with shutters, which are arranged in the beam path of the interferometer such that they block the distortions such that these portions of the working beam are not interfered with the reference beam on the detector.

However, it is also possible to provide a second hologram reconstruction unit. In this advantageous embodiment of the interferometer according to the invention, the working beam first impinges the first hologram reconstruction unit and is here influenced as described above.

Subsequently the working beam and perhaps distortions of the working beam impinge the measuring object, where at least a partial reflection occurs, as described above. It is essential that in this exemplary embodiment the reflected working beam reenters the beam path of the interferometer via the second hologram reconstruction unit. The second hologram reconstruction unit can here be implemented according to one of the above-described embodiments, i.e. particularly as a reflecting or transmitting hologram reconstruction unit.

The hologram control unit is also connected to two hologram reconstruction units, so that an optionally predetermined hologram can also be created in the second hologram reconstruction unit.

It is essential that the hologram control unit creates a hologram in the second hologram reconstruction unit depending on the hologram created in the first hologram reconstruction unit so that distortions of the at least partially reflected working beam can be blocked via the second hologram reconstruction unit.

This way faulty measurements from distortions can be avoided: the hologram in the second hologram reconstruction unit is created such that a working beam at least partially reflected on a point on the object to be measured is deflected in the second hologram reconstruction unit such that it impinges the optic detector in the beam path of the interferometer, perhaps via additional optic components such as beam splitters or mirrors.

An undesired component of the working beam resulting from the distortions can impinge a differently located point of the measuring object and here also be reflected to the second hologram reconstruction unit by an at least (partial) reflection. However, this reflected undesired component of the working beam impinges the second hologram reconstruction unit at a different angle than the working beam reflected at the measuring point on the measuring object to be measured, thus fails to enter the predetermined beam path of the interferometer, and also fails to impinge the detector. Therefore the measurement is not falsified by the undesired components of the working beam.

Advantageously, a shutter is provided in the beam path of the interferometer between the second hologram reconstruction unit and the detector, which blocks any beams leaving the second hologram reconstruction unit at an angle not aligned to the detector. This shutter can advantageously be embodied as a pinhole.

As described above, the interferometer is particularly characterized in high flexibility with regard to influencing the working beam by the hologram reconstruction unit. In an advantageous embodiment the hologram control unit is embodied such that depending on a predetermined number of partial working beams and one predetermined angle for each working beam, a respective hologram is created in the hologram reconstruction unit. In this way, the working beam is split into a predetermined number of partial beams and each partial beam is deflected by the angle predetermined for said partial beam.

The interferometer according to the invention can therefore be embodied in a very simple manner as a multi-beam interferometer, which shows high flexibility.

Both the number of partial beams as well as the deflection angle can be optionally preset for each partial beam. This way, arbitrary points on the measuring object can be simultaneously impinged with working beams. This is an essential advantage in reference to known measuring methods in which a measuring object is lit by a rigid rectangular dot matrix. In the interferometer according to the invention the dot matrix and the number of working beams and thus the measuring points simultaneously lit can be adjusted arbitrarily to the object to be measured. Furthermore, it is possible to change the dot matrix during the measuring process, for example in order to achieve an adjustment to the motion of the object or to a change of the surface of the object to be measured.

In this case the predetermined angle is to be understood as described above, i.e. the predetermined angle defines an unambiguous spatial direction for the deflected working beam.

Advantageously the interferometer is embodied such that the hologram control unit, depending on several measuring points predetermined on the object, creates a respective hologram in the hologram reconstruction unit so that the working beam is split into one partial working beam per measuring point and these partial beams are deflected such that each predetermined measuring point on the hologram is impinged with one of the partial working beams so that simultaneously measurements can be taken at all predetermined measuring points.

It is also possible that the working beam is split into a predetermined number of partial working beams in a known beam multiplier and only the deflection of the partial working beams is performed by the hologram reconstruction unit. The beam multiplier can for example be implemented by a combination of a lens for fanning the working beam and a shutter having one opening per partial working beam each.

For the simultaneous measuring and evaluation of several measuring points on the object the interferometer according to the invention is advantageously embodied as follows:

In this embodiment the interferometer comprises a processing unit, a beam multiplier, and one detector for each partial working beam. In this case the maximum number of partial working beams is therefore predetermined by the number of detectors.

The beam multiplier is arranged in the beam path of the reference beam and embodied such that the reference beam is split into one partial reference beam per partial working beam. Similar to the design of the one-beam interferometer the multi-beam interferometer is designed such that one partial reference beam each is interfered with one partial working beam on the detector. Therefore, at each detector the interference signal for the measuring point on the object allocated to the working beam of said detector can be detected.

The processing unit is connected to the detectors and advantageously embodied such that it simultaneously evaluates the measuring signals of the detectors. A simultaneous evaluation may comprise that the measuring signals of the detectors are simultaneously digitized and/or that the measuring signals of the detectors are simultaneously demodulated. Here, the processing unit can be embodied such that for time-critical analysis processes one processing unit is provided per detector. It is particularly advantageous when the processing unit comprises one demodulation unit per detector so that the measuring signals of all detectors are simultaneously demodulated without the demodulation units mutually influencing each other, so that a falsification of the measurement based on temporal delays of one demodulation unit is excluded.

The above described advantages are therefore generally based in that a spatial light modulator is used in an interferometer for deflecting and/or splitting the working beam of the interferometer, with the spatial light modulator influencing the working beam via a hologram, as described above.

BRIEF DESCRIPTION OF THE DRAWINGS

One exemplary embodiment of the interferometer according to the invention is explained in the following using the figures. Shown are.

DETAILED DESCRIPTION OF THE PREFERRED EMBODIMENTS

Figure 1:
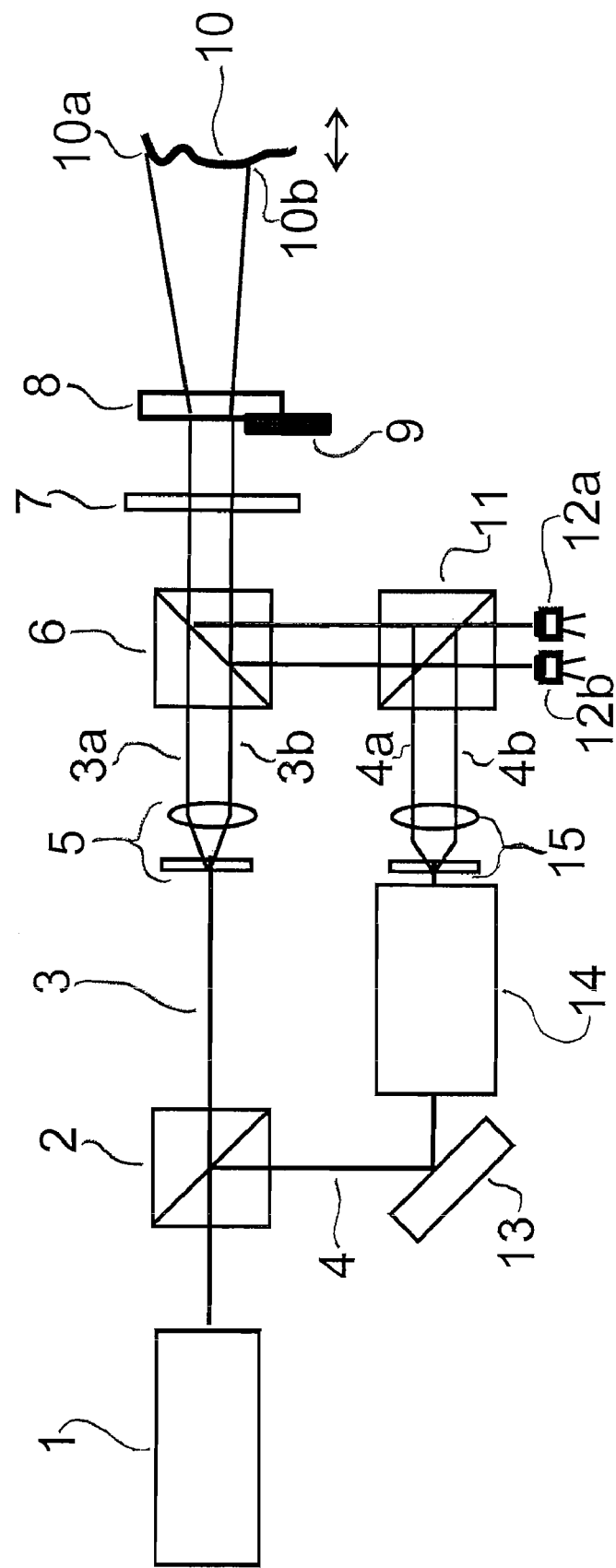
FIG. 1 is a view of an exemplary embodiment of the interferometer according to the invention in form of a multi-beam interferometer having a transparent hologram reconstruction unit.

In FIG. 1 an interferometer according to the invention is shown in which the light source 1 is provided as a Laser. The light beam created by the light source is split into a working beam 3 and a reference beam 4 by a first beam splitter 2.

The working beam 3 is split into a multitude of partial working beams via the first beam multiplier 5, with only two partial working beams 3a and 3b being shown. The partial working beams pass through a second beam splitter 6 as well as a λ/4-plate 7 and impinge the transparent hologram reconstruction unit 8, embodied as a LCD.

The transparent hologram reconstruction unit is connected to a hologram control unit 9, which depending on the angles predetermined for each partial working beam (3a, 3b) a hologram is created in the hologram reconstruction unit 8, so that each partial working beam is deflected according to the preset angle.

The angles for deflecting the partial measuring beams are selected such that each partial working beam impinges the object 10 to be measured at a predetermined measuring point (10a, 10b).

The partial working beams at least partially reflected by the object 10 each reenter the beam path of the interferometer via the hologram reconstruction unit 8, with each partial working beam impinging one detector (12a, 12b) each via the λ/4-plates 7, the second beam splitter 6, and a third beam splitter 11.

The reference beam 4 is guided via a mirror 13 to a frequency shift unit 14 embodied as a Bragg cell. The Bragg cell changes the frequency of the reference beam 4 such that the frequency of the working beam 3 and the reference beam 4 are off-set in reference to each other, i.e. the interferometer shown in FIG. 1 is embodied as a heterodyne interferometer.

The working beam 4 is subsequently split into a multitude of partial reference beams by the second beam multiplier 15, so that an identical number of partial working beams and partial reference beams are given. Only two partial reference beams 4a and 4b are shown in FIG. 1.

The partial reference beams 4a and 4b are also guided to the detectors 12a and 12b via the third beam splitter 11, so that on the first detector 12a the (at least partially reflected) first partial working beam 3a is interfered with the first partial reference beam 4a and on the second detector 12 the partial working beam 3b is respectively interfered with the partial reference beam 4b.

The light source 1 creates polarized light and the beam splitters 2, 6, and 11 are embodied as polarizing beam splitters. In cooperation with the λ/4-plate 7, a deflection of the light beams is therefore possible without any essential loss of intensity.

The interferometer shown in FIG. 1 further comprises a processing unit (not shown), which is connected to the detectors (12a, 12b). The processing unit comprises one demodulation unit for each detector, so that the measuring signals of the detectors are simultaneously demodulated.

Therefore, in the interferometer shown in FIG. 1 a multitude of measuring points on the object 10 can be measured simultaneously. It is essential that the arrangement of the measuring points on the object 10 can be freely predetermined and that a respective hologram can be created in the hologram reconstruction unit 8 by the hologram control unit 9 depending on the predetermined measuring points so that the partial working beams (3a, 3b) are deflected to the predetermined measuring points.

Figure 2:
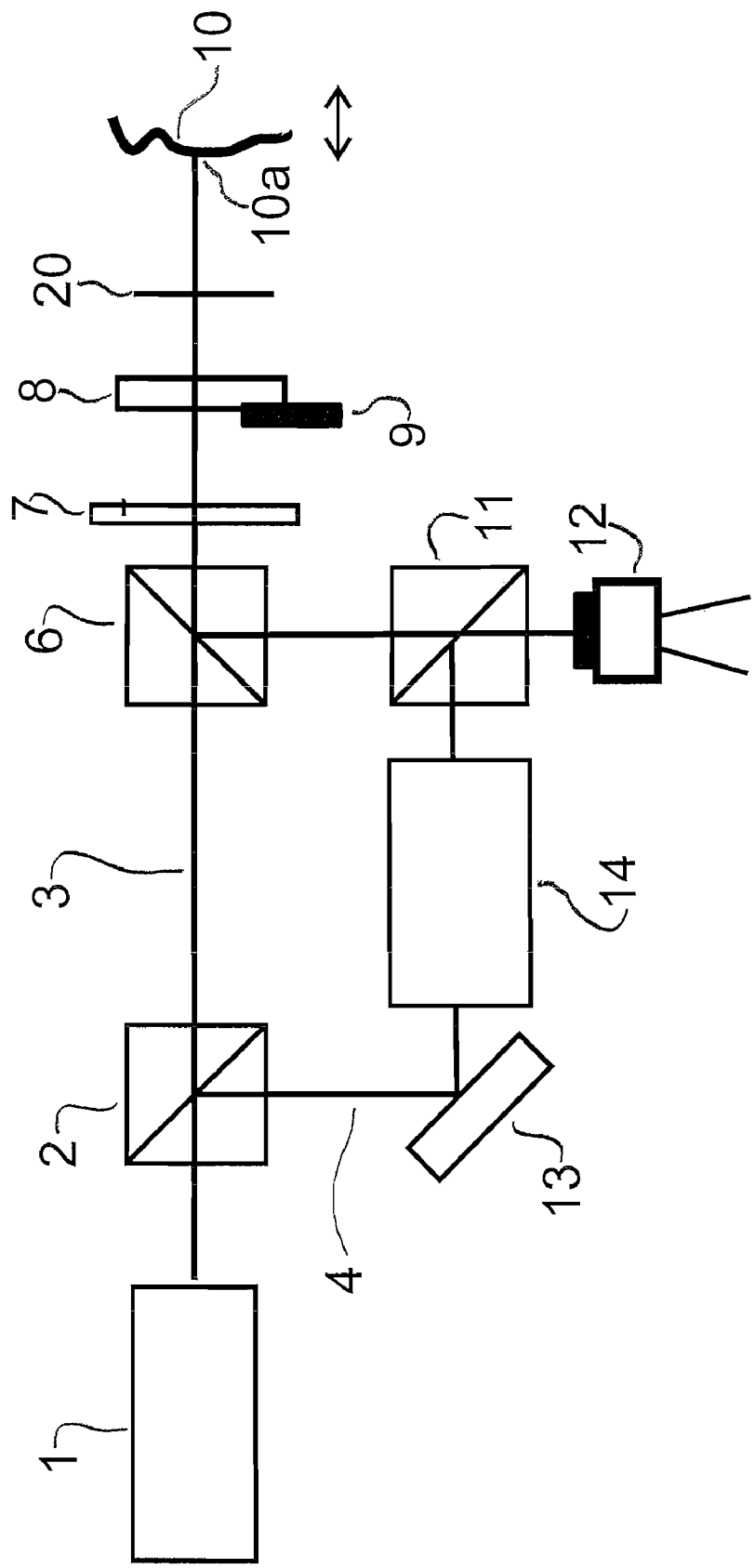
FIG. 2 is a view of an exemplary embodiment of the interferometer according to the invention in the form of a one-beam interferometer, in which the distortions of the working beam are blocked by a shutter.

FIG. 2 shows an exemplary embodiment in which the interferometer according to the invention is embodied as a one-beam interferometer. The design is generally equivalent to the one shown in FIG. 1 and provided with the same elements having the same reference characters. Based on the embodiment as a one-beam interferometer, the interferometer shown in FIG. 2 has only one detector 12.

In this exemplary embodiment the working beam 3 is not split and passes through the second beam splitter 6, the λ/4-plate 7, the hologram reconstruction unit 8, and impinges the object 10 to be measured at a predetermined measuring point 10a.

It is essential that in this exemplary embodiment, a shutter 20 is arranged in the beam path of the working beam between the hologram reconstruction unit 8 and the object 10 in order to block any distortions of the working beam.

The shutter is embodied such that approximately 75% of the potential deflection range of the working beam 3 is blocked by the shutter. This is explained in FIG. 3.

Figure 3:
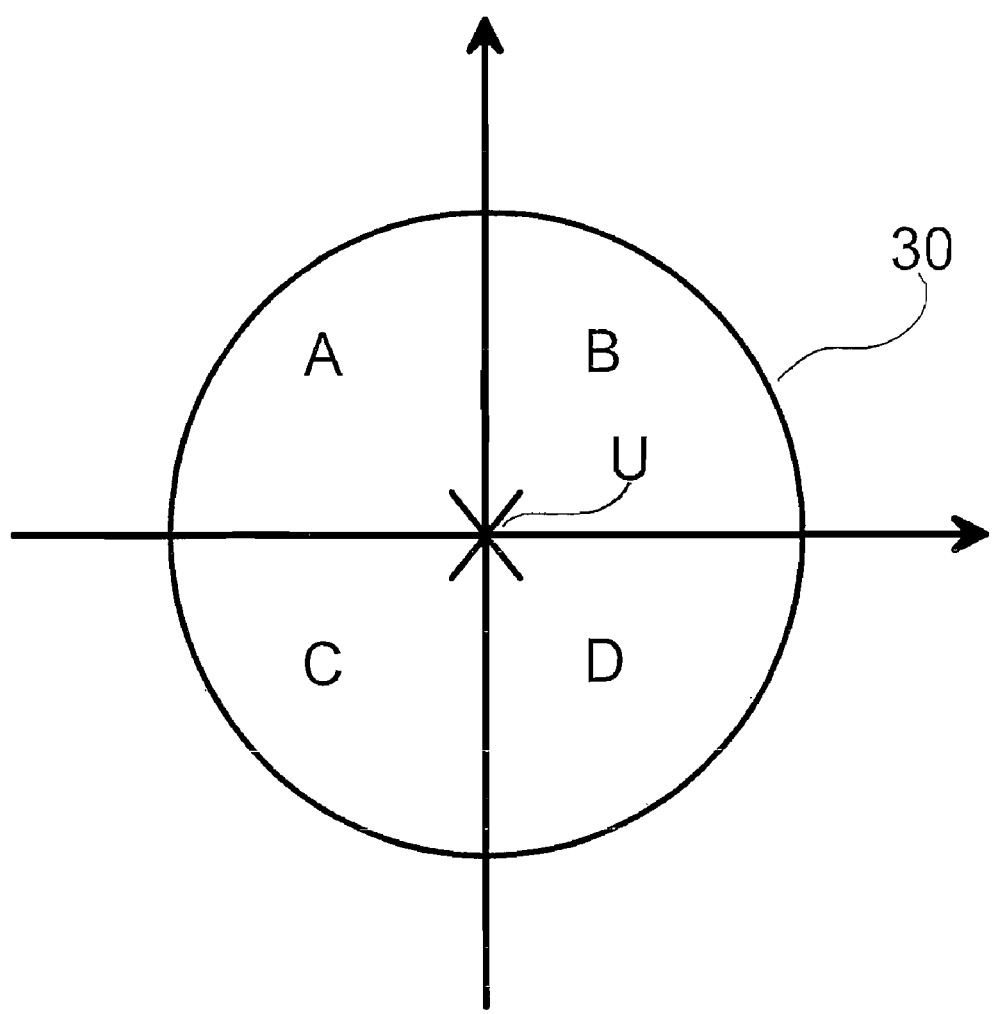
FIG. 3 is a schematic view of the area blocked in FIG. 2 by the shutter.

In FIG. 3 the deflection area of the working beam is shown by the circle 30, as possible in FIG. 2 at a position of the shutter 20 perpendicular in reference to the level of the drawing in FIG. 2.

A working beam 3 that is not deflected will pass through the base of the coordinate system shown in FIG. 3 at the point marked with the reference character U and subsequently impinges the measuring object 10.

By the hologram reconstruction unit 8, the working beam can be directed to any arbitrary point within a certain spatial angle, i.e. within this spatial angle an arbitrary spatial direction can be predetermined. The exterior limit of the spatial angle is shown by the circle 30 in FIG. 3.

The shutter 20 is now embodied such that it allows the working beam to pass through one quadrant only and blocks the working beam in the other three quadrants. The shutter 20 can for example be embodied such that the working beam can only pass through the shutter 20 in the quadrant marked with the reference character A in FIG. 3.

Although the area, in which the object 10 can be impinged with measuring points, is reduced it is advantageous that distortions of a working beam deflected within the area A typically appear in one of the other quadrants, i.e. in one of the areas B, C, or D, and are blocked by the shutter 20.

This way it is possible to avoid the falsification of measurements by distortions of the working beam.

Figure 4:
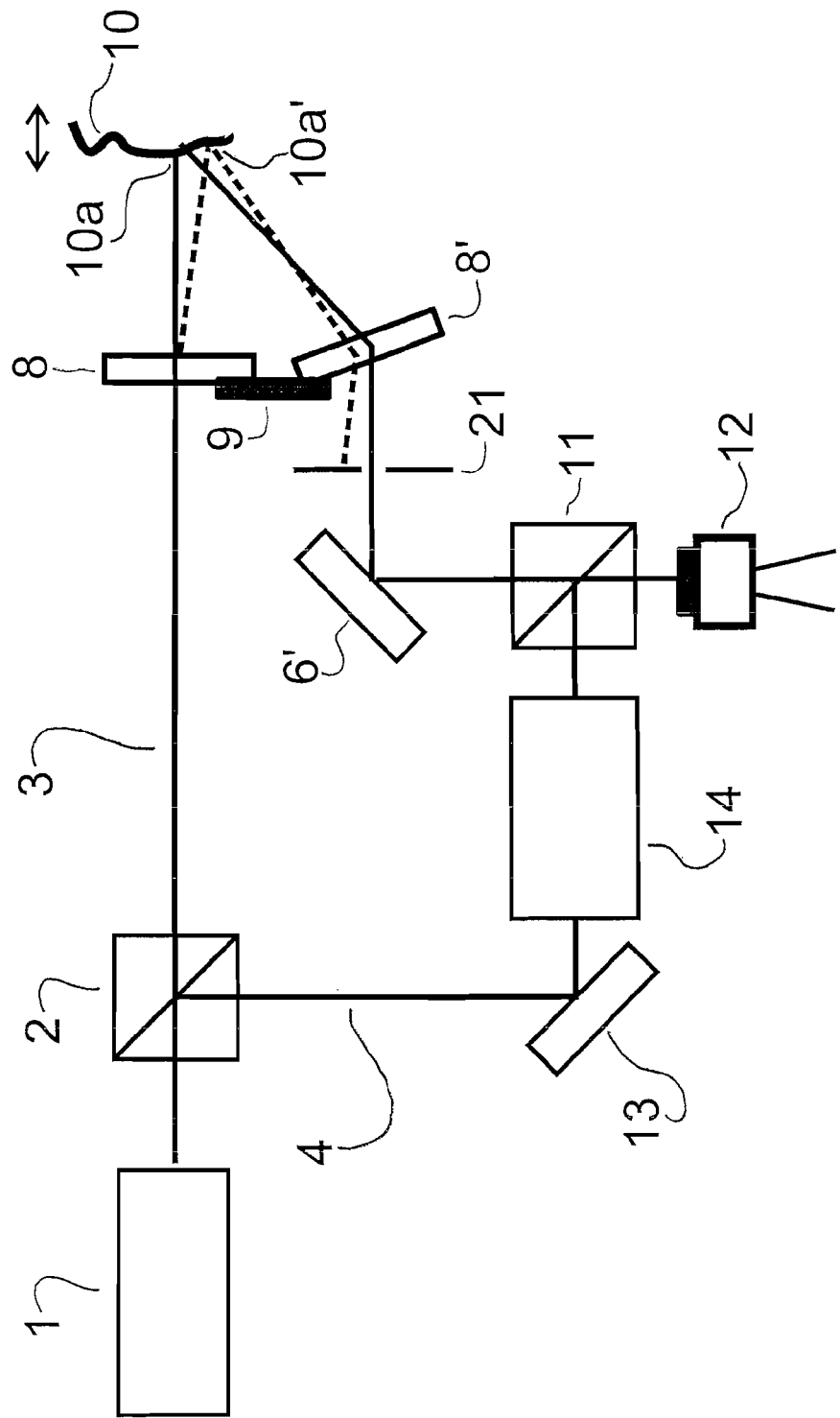
FIG. 4 is a view of an exemplary embodiment of the interferometer according to the invention in form of a one-beam interferometer, in which a second hologram reconstruction unit prevents that distortions of the working beam impinge the detector.

FIG. 4 shows another exemplary embodiment in which the interferometer is also embodied as a one-beam interferometer.

Here, the design is also essentially equivalent to the one of FIG. 1 and FIG. 2 and identical elements are marked with the same reference characters.

It is essential that in FIG. 4 the interferometer comprises a second hologram reconstruction unit 6', which is also connected to the hologram control unit 9, so that the hologram control unit 9 can create one hologram each in both hologram reconstruction units (8, 8').

When a working beam 3 passes through the first hologram reconstruction unit 8, as described above, it is influenced by the hologram shown in the hologram reconstruction unit 8 such that it is deflected to a predetermined measuring point 10a on the measuring object 10.

In FIG. 4 additionally a potential distortion is shown by a dashed line, i.e. a portion of the working beam 3 deflected at a different angle than the predetermined one. This undesired portion of the working beam can also impinge the object 10 at a point 10a' locally different from the point 10a and here also be partially reflected.

It is essential in the exemplary embodiment in FIG. 4 that the working beam 3 reenters the beam path of the interferometer via the second hologram reconstruction unit 8' and finally is interfered with the reference beam 4 on the detector 12. In this exemplary embodiment the beam splitter 6 is replaced by a mirror 6'.

The undesired portion of the working beam also impinges the second hologram reconstruction unit 8 however at a different angle than the reflected working beam 3.

The control unit 9 creates a hologram in the second hologram reconstruction unit 8', which is embodied such that, starting at the predetermined measuring point 10a, the at least partially reflected working beam 3 is deflected by the second hologram reconstruction unit 8' such that it impinges the detector 12.

Due to the fact that the undesired portion of the working beam impinges the second hologram reconstruction unit 8' at a different angle it is also deflected here at a different angle, in particular not in the direction of the predetermined beam path to the detector 12.

In this manner, any falsification of the measurements by a distortion of the working beam is avoided, such as for example by the undesired portion of the working beam in FIG. 4.

It is further advantageous to prevent disturbing reflexes within the interferometer by the undesired portion of the working beam by arranging a pinhole 21 in the beam path of the interferometer between the reconstruction unit 8' and the detector 12, which releases the predetermined beam path of the working beam 3, however blocking disturbing portions, such as for example the undesired portion of the working beam shown in dashed lines.

The devices shown in FIG. 2 and FIG. 4 are illustrated as one-beam interferometers due to the simple design. Of course, in multi-beam interferometers an avoidance of distortions can also be achieved, in particular the suppression of distortions shown in FIG. 4, by a second hologram reconstruction unit 8', which is advantageous in combination with the creation of several partial working beams.

The invention claimed is:

1. An interferometer for the optic measuring of an object (10), comprising a light source (1) with at least one beam splitter (2) and at least one detector (12, 12a, 12b), with the at least one beam splitter (2) being arranged in a beam path of the light source (1) such that a light beam created by the light source (1) is split into a working beam (3, 3a, 3b) and a reference beam (4, 4a, 4b), and the interferometer is arranged such that the working beam (3, 3a, 3b) impinges the object (10) to be measured and the working beam (3, 3a, 3b) is at least partially reflected by the object (10) and is interfered with the reference beam (4, 4a, 4b) on the detector, a spatial light modulator comprising a hologram control unit (9) and a hologram reconstruction unit (8) connected thereto are provided, with the hologram reconstruction unit (8) being arranged in the beam path of the working beam (3, 3a, 3b) between the beam splitter (2) and the object and the hologram control unit (9) controls the hologram reconstruction unit (8) so that the hologram reconstruction unit creates a generated hologram so the working beam (3, 3a, 3b) is at least one of deflected or split via the hologram reconstruction unit (8), the hologram control unit (9) is configured to create the hologram in the hologram reconstruction unit (8) depending on several measuring points (10a, 10b) predetermined on the object such that the working beam is split by the hologram reconstruction into one partial working beam per measuring point unit and the partial beams are deflected such that one of the partial working beams impinges each of the measuring points, the interferometer comprises a processing unit, a beam multiplier (15), and one detector (12a, 12b) for each of the partial working beams (3a, 3b), with the beam multiplier being arranged in the beam path of the reference beam (4) to split the reference beam (4) into a partial reference beam (4a, 4b) per each of the partial working beams, the interferometer being configured such that one of the partial reference beams is interfered with one of the partial working beams on each of the detectors and with the processing unit being connected to the detectors (12a, 12b) to simultaneously evaluate the measurements of the detectors.

2. An interferometer according to claim 1, wherein the processing unit at least one of simultaneously digitizes the measurements of the detectors (12a, 12b) or simultaneously demodulates the measurements of the detectors.

* * * * *